US007175193B2

(12) United States Patent
Wu

(10) Patent No.: US 7,175,193 B2
(45) Date of Patent: Feb. 13, 2007

(54) WHEEL BRACKET MECHANISM FOR AN ELECTRIC WHEELCHAIR EQUIPPED WITH AUXILIARY WHEELS

(75) Inventor: Daniel P. H. Wu, Hsin-Feng Hsiang (TW)

(73) Assignee: Pi Hsiang Machinery Mfg. Co., Hsinchu County (TW)

( * ) Notice: Subject to any disclaimer, the term of this patent is extended or adjusted under 35 U.S.C. 154(b) by 318 days.

(21) Appl. No.: 10/699,267

(22) Filed: Oct. 31, 2003

(65) Prior Publication Data

US 2004/0168839 A1 Sep. 2, 2004

(30) Foreign Application Priority Data

Feb. 27, 2003 (TW) .............................. 92203064 U

(51) Int. Cl.
*B60G 5/04* (2006.01)

(52) U.S. Cl. ............................ 280/304.1; 280/124.16; 280/9; 180/907; 180/65.1; 267/279

(58) Field of Classification Search ........ 280/DIG. 10, 280/42, 250.1, 304.1; 297/DIG. 4; D12/131; 403/63, 65, 72, 80
See application file for complete search history.

(56) References Cited

U.S. PATENT DOCUMENTS

| | | | | |
|---|---|---|---|---|
| RE28,259 E * | 12/1974 | Henschen | .................. | 267/279 |
| 6,070,898 A * | 6/2000 | Dickie et al. | ............ | 280/304.1 |
| 6,135,222 A * | 10/2000 | Furukawa | .................. | 180/65.5 |
| 6,199,647 B1 * | 3/2001 | Schaffner et al. | .......... | 180/65.1 |

* cited by examiner

*Primary Examiner*—Christopher P. Ellis
*Assistant Examiner*—John Walters
(74) *Attorney, Agent, or Firm*—Charles E. Baxley

(57) ABSTRACT

A wheel bracket mechanism for an electric wheelchair equipped with auxiliary wheels, which comprises a frame, a pair of drive wheel brackets, four pedestal assemblies, a pair of caster brackets, a pair of oscillating assembly and a pair of anti-tipping brackets. The frame is provide with a pair of castor brackets at the front end and a pair of anti-tipping brackets at the rear end thereof, a pair of drive wheel brackets are secured to the frame with a front end stretching ahead of it and located between the castor brackets and the anti-tipping brackets, and between the castor brackets and the drive wheel bracket disposed an oscillating assemblies, four pedestal assemblies equipped with cushioning blocks are disposed at both sides of the front and rear end of the frame respectively in pairs with located opposite to each other.

4 Claims, 6 Drawing Sheets

WHEEL BRACKET MECHANISM FOR AN ELECTRIC WHEELCHAIR EQUIPPED WITH AUXILIARY WHEELS

BACKGROUND OF THE INVENTION

1. Field of the Invention

The present invention relates a wheel bracket mechanism for an electric wheelchair, and more particularly to a wheel bracket mechanism for an electric wheelchair equipped with auxiliary wheels.

2. Description of the Prior Arts

Electric wheelchairs have become an indispensable means of transport for the ailing old or the handicapped people to help them in indoor and out activities, such as traveling and boarding on the airplane, and so on.

A wheel bracket mechanism of a conventional electric wheelchair (and transport means or the like) is normally rectangular-formed as shown in FIG. 1, which discloses a rectangular frame 10 is provided with front wheel bracket 11 and rear wheel bracket 12 respectively at the front end and the rear end thereof for being mounted with front wheel and rear wheel respectively, and a drive wheel bracket 13 (the drive wheel bracket 13 is mounted with drive wheel) is disposed between the front and the rear wheel brackets 11,12. Furthermore, the front wheel bracket 11 and the drive wheel bracket 13 is respectively provided with a compressive spring 14, the compressive spring 14 is provided for allowing the front wheel bracket 11 and the drive wheel bracket 13 to extend or contract relative to each other upon a bump, such give rise to a cushioning effect in case of riding up and down a slope or on the uneven roads. Although this conventional wheel chair has the main functions of a wheelchair, there are still some disadvantages needs to be overcome as stability, safety and comfortableness are concerned:

First, in terms of stability, the conventional rectangular frame 10 just takes advantage of the longitudinal expansion and compression of the compressive spring 14 to maintain the stability. Although the elastic forces of the compressive spring can force the front wheel bracket 11 and the drive wheel bracket 13 to move back to the predetermined position, it may also cause vertical vibrations of the rectangular frame 10. Such an unstable electric wheelchair is not able to provide a comfortable driving to the occupants, especially to the old patients, most of them are old and disabled.

Second, in terms of security, although the conventional rectangular frame 10 is allowed to expand or contract with the help of the compressive spring 14. However, the contraction or expansion of the front wheel bracket 11 and the drive wheel bracket 13 are performed independently and individually due to no coordinating device disposed therebetween, furthermore the rear wheel bracket 12 is incompressible, Thereby the conventional rectangular frame 10 will be tilted and swayed along with the motion of the respective wheel brackets, and the center of gravity of the wheelchair moves back and forth substantially. Such that the wheelchair is susceptible to tip, it is absolutely unfit for the old and handicapped people.

The present invention has arisen to mitigate and/or obviate the afore-described disadvantages of the conventional electric wheelchair.

SUMMARY OF THE INVENTION

In accordance with one aspect of the present invention, there is provided with a wheel bracket mechanism for an electric wheelchair equipped with auxiliary wheels, which comprises a frame, a pair of drive wheel brackets, four pedestal assemblies, a pair of caster brackets, a pair of oscillating assembly and a pair of anti-tipping brackets. The frame is provided with a pair of castor brackets at the front end and a pair of anti-tipping brackets at the rear end respectively, a pair of drive wheel brackets are secured to the frame with a front end stretching ahead thereof and located between the castor brackets and the anti-tipping brackets, and between the castor brackets and the drive wheel bracket disposed an oscillating assemblies, four pedestal assemblies equipped with cushioning blocks are disposed at both sides of the front and rear end of the frame respectively in pairs with located opposite to each other.

The primary objective of the present invention is to provide a wheel bracket mechanism for an electric wheelchair, which provides a stable support to the frame by virtue of the pedestal assemblies. Furthermore, an oscillating assembly disposed between the castor wheel brackets and the drive wheel brackets, such that, by virtue of the coordination of the three, the wheelchair is able to automatically adjust the castor wheel brackets and the drive wheel brackets by itself in case of riding up and/or down a slope. Thereby the electric wheelchair of the present invention is capable of providing a safe and stable ridding according to different slopes.

The further objective of the present invention is to provide a wheel bracket mechanism for an electric wheelchair provided with a plurality of pedestal assemblies equipped with cushioning block, the expansion and compression of the pedestal assemblies possess is much smooth and stable than that of spring, no elastic shake will be caused. By such an arrangement, the stability of the wheelchair of the present invention is better than that of the conventional one.

The present invention will become more obvious from the following description when taken in connection with the accompanying drawings, which shows, for purpose of illustrations only, the preferred embodiments in accordance with the present invention.

DETAILED DESCRIPTION OF THE PREFERRED EMBODIMENT

Figure 1:
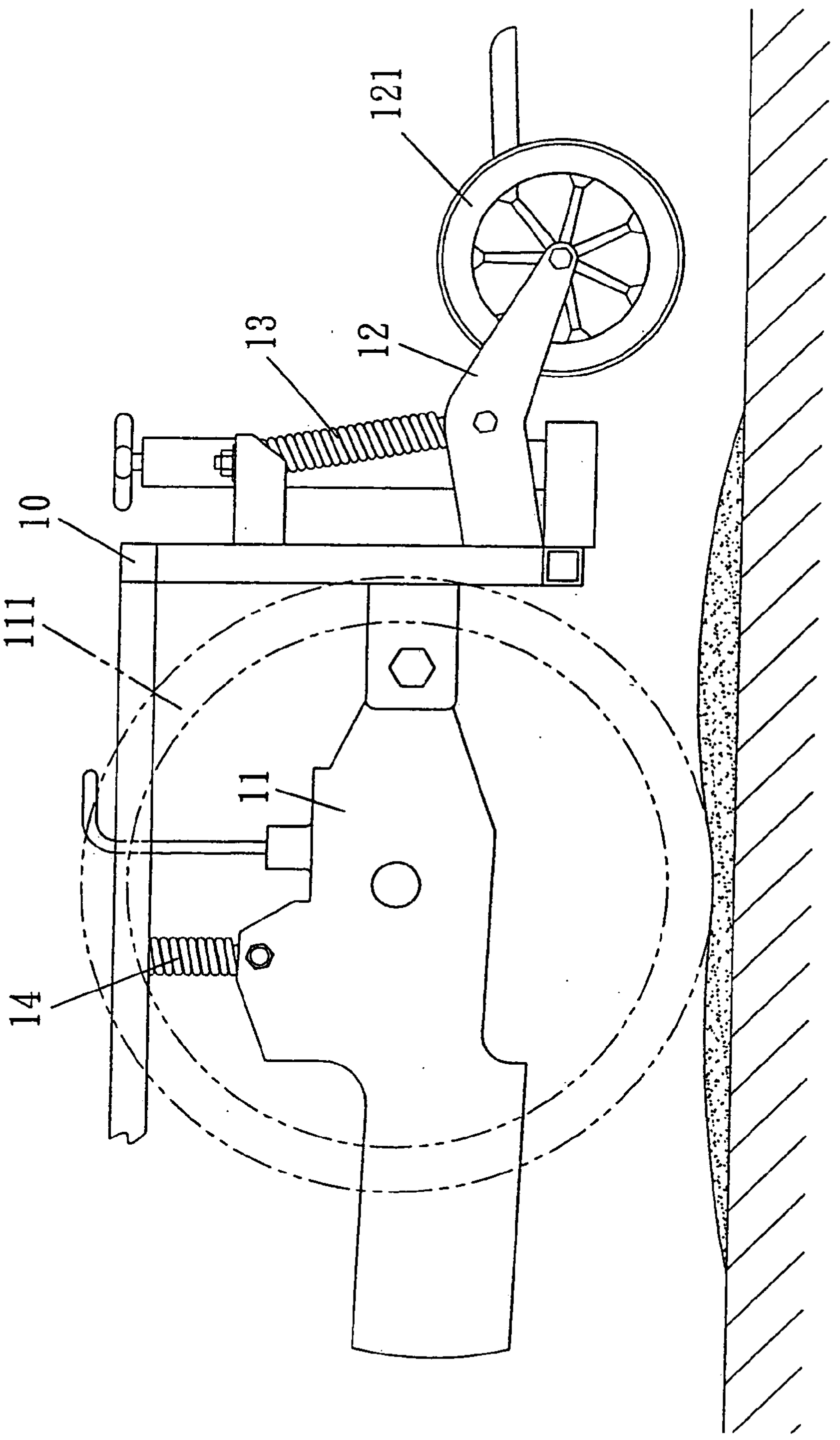
FIG. 1 PRIOR ART
FIG. 1 is a schematic plan view of a conventional wheelchair.
Figure 2:
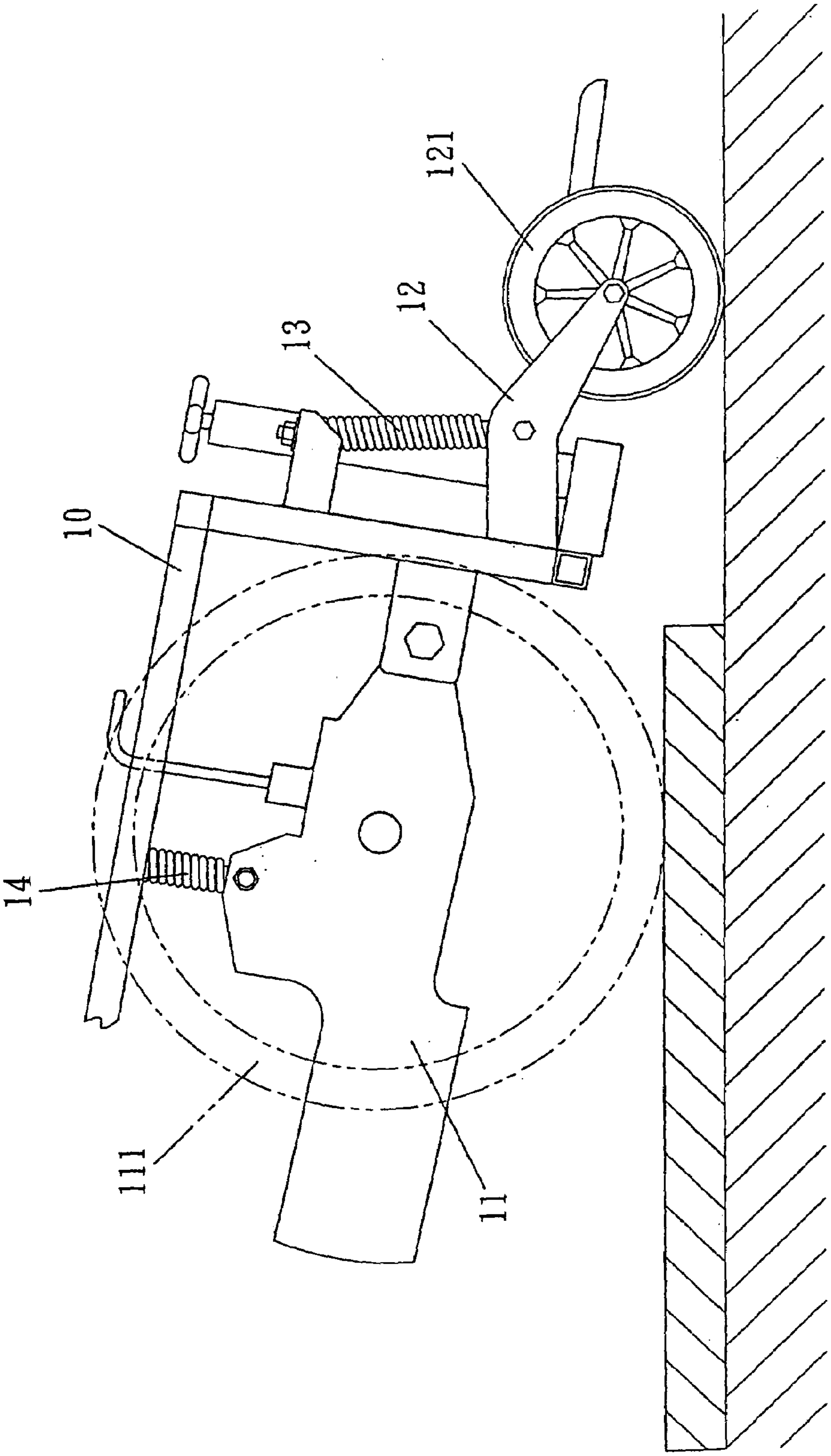
FIG. 2 PRIOR ART
FIG. 2 is an exploded view of a wheel bracket mechanism of an electric wheelchair in accordance with the present invention.
Figure 3:
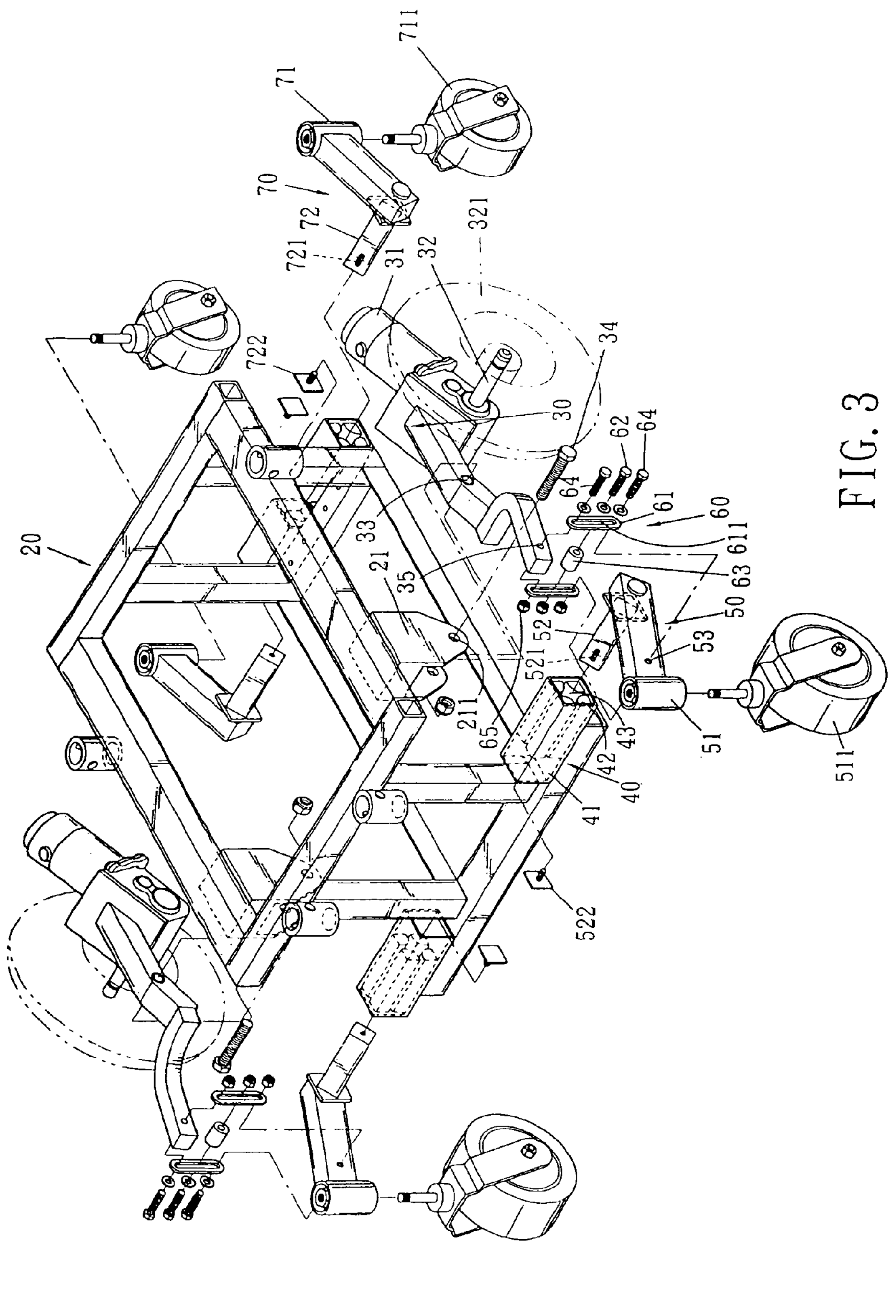
FIG. 3 is a side view of the wheel bracket mechanism of an electric wheelchair in accordance with the present invention.

Referring to FIGS. 2–3, wherein, in accordance with the present invention, a wheel bracket mechanism for an electric wheelchair equipped with auxiliary wheels is shown and generally comprises a frame 20, a pair of drive wheel brackets 30, four pedestal assemblies 40, a pair of castor brackets 50, a pair of oscillating assembly 60 and a pair of anti-tipping brackets 70.

The frame 20 in shape of rectangle is provided with two ear members 21 at both sides with symmetrical to each other and located between the front and rear end. Each of the ear members has an aperture 211 defined thereof.

The drive wheel bracket 30 is a crank member, at the rear end of which is secured a motor 31 and drive shaft 32 respectively. The drive shaft 32 serves to drive the drive wheel 321. At the middle of the drive wheel bracket 30 is provided with a hole 33 which corresponding to an aperture 211 of the ear member 21 of the frame 20, and by an axle 34 inserting through the hole 33 and the aperture 211 of the ear member 21. Moreover, the front end of the drive wheel bracket 30 stretches ahead of the frame 20 and at the front portion of which is defined with an aperture 35.

The pedestal assemblies 40 each consists of a tube 41 and a plurality of cushion blocks 42. The tubes 41 are disposed at both sides of the front and rear end of the frame 20 respectively in pairs with located opposite to each other. The cushion blocks 42 disposed in inner sides of the corresponding tube 42 and defined a space 43 squared in cross section.

The castor brackets 50 is each provided with a castor 511 secured to a strut 51 at the front end and a rod 52 squared in cross section vertically disposed at the rear end thereof. The rod 52 having a threaded hole 521 defined at the end and to be received in the corresponding spaces 43 of the pedestal assemblies 40 (the two pedestal assemblies 40 mentioned above are located at the front end of the frame 20) and with covering member 522 screwing in the threaded hole 521. Furthermore, an aperture 53 is defined in the castor bracket 50 adjacent to the strut 51, where corresponding to the location of the aperture 35 of the drive wheel bracket 30.

The oscillating assembly 60 consists of a pair of plates 61, a rolling shaft 62 and a roller 63. The plates 61 is each provided with a stripe aperture 611, each of plates 61 is engaged with the aperture 35 of the drive wheel bracket 30 and the aperture 53 of the castor bracket 50 via the top and bottom of the aperture 611 respectively by virtue of a pair of bolts 64 and screw nuts 65. The roller 63 mounted onto the rolling shaft 62, then the rolling shaft 62 is disposed in the middle of the stripe aperture 611 of the plates 61 by virtue of a screw nut 65.

The anti-tipping brackets 70 is each provided with an anti-tipping wheel 711 secured to a strut 71 at the front end and a rod 72 squared in cross section vertically disposed at the rear end thereof. The rod 72 including a threaded hole 721 defined at the end and to be received in the corresponding spaces 43 of the pedestal assemblies 40 (the two pedestal assemblies 40 mentioned above are located at the rear end of the frame 20) and with covering member 722 screwing in the threaded hole 721.

Figure 4:
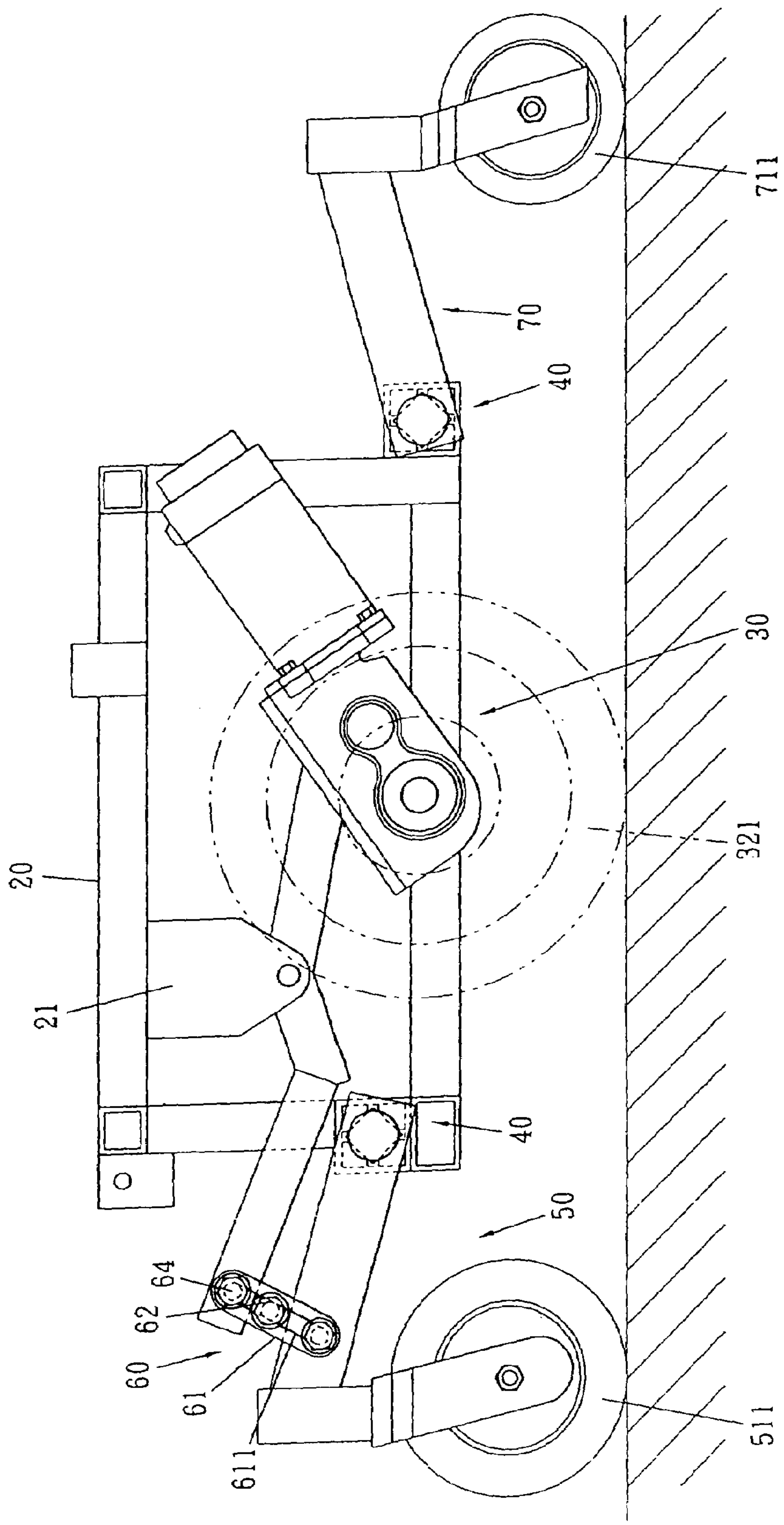
FIG. 4 is a schematic plan view of showing the wheel bracket mechanism of an electric wheelchair in accordance with the present invention is ridding up a slope.

In operation with referring to FIG. 4, which shows a wheelchair of the present invention is riding on a slope. The castor 511 of the castor wheel bracket 50 locates at a relatively higher level of the slope and being under an upright pressure. Accordingly, the squared rod 52 pushes the majority of the cushioning blocks 42 in the corresponding pedestal assemblies 40 (the cushioning blocks 42 are deformed and start to store energy) and causes a slight clockwise spin of the castor wheel bracket 50 (as indicated in FIG. 4). While the drive wheel bracket 30 is not pressed, so the pair of the plates 61 of the oscillating assembly 60 starts to the spin counterclockwise. Meanwhile, with the spin of the plates 61 together with roller 63 and the stripe aperture 611, the pressure is transmitted to the front end of the drive wheel bracket 30. And the rear portion of the drive wheel 321 of the drive wheel bracket 30 will take part of the pressure from the castor 511 (clockwise force) by virtue of the axel 34 of the drive wheel bracket 30 together with the aperture 211 of the ear member 21. Such that the ascension of the castor bracket 511 will not cause an upright inclination of the front end of the frame 20, but cooperating with the drive wheel 321 of the drive wheel bracket 30 to raise the frame 20 steadily. Thereby, in case of ridding up a slope, the castor wheel bracket 50 and the drive wheel bracket 30 will slightly spin clockwise, and the frame 20 will slightly raise up in steady without inclined as conventional frame do.

Until the roller 63 running to other side, which indicates that the ascension of the castor bracket 50 is great (the upward slope is steep), the pressure of the castor 511 will be more precisely transmitted to the drive wheel bracket 30 (the castor bracket 50 and the drive wheel bracket 30 acting as a whole). Thereby, the wheelchair of the present invention is able to adjust itself automatically in accordance with different upward slopes.

Figure 5:
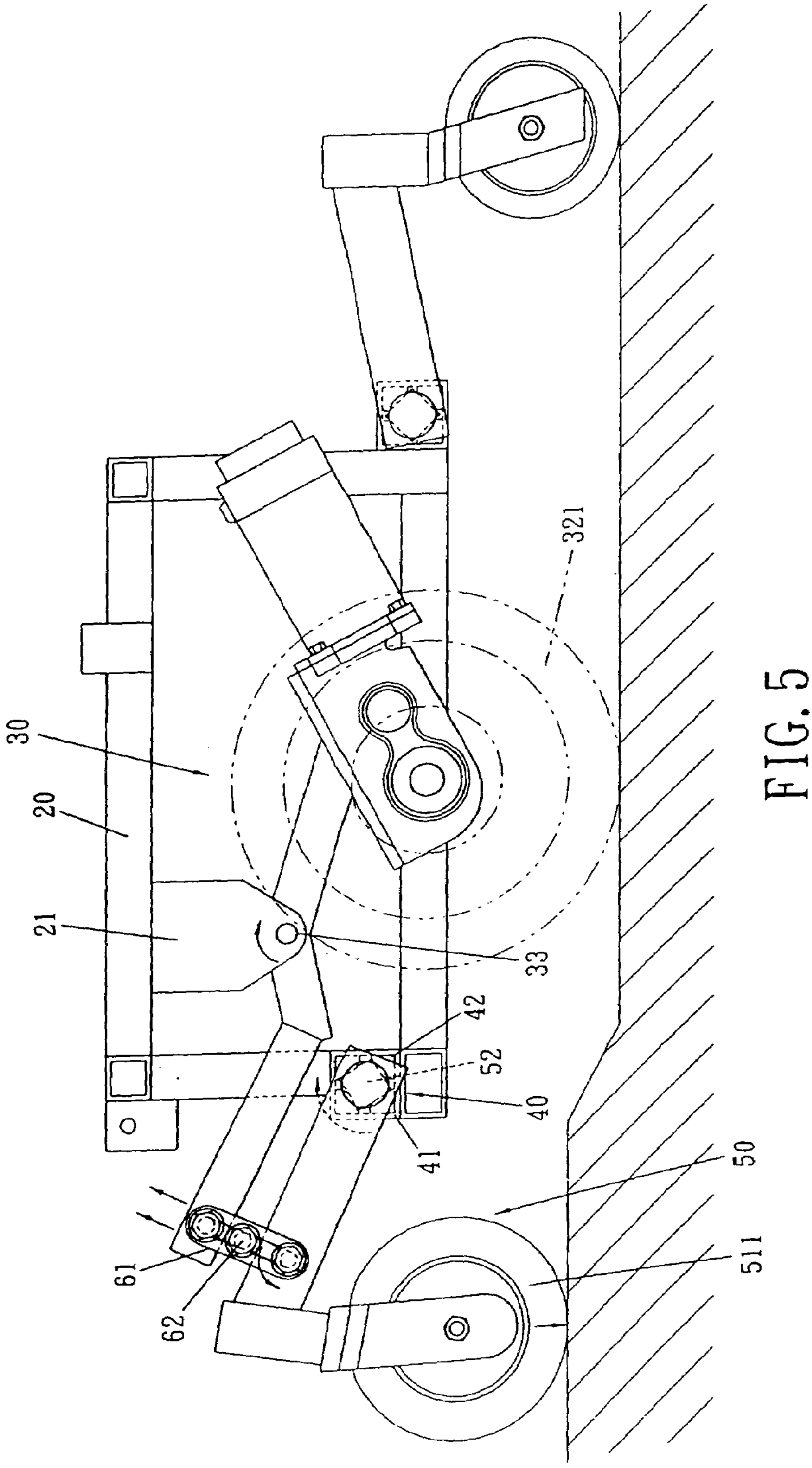
FIG. 5 is a schematic plan view of showing the wheel bracket mechanism of an electric wheelchair in accordance with the present invention is riding down a slope.
Figure 6:
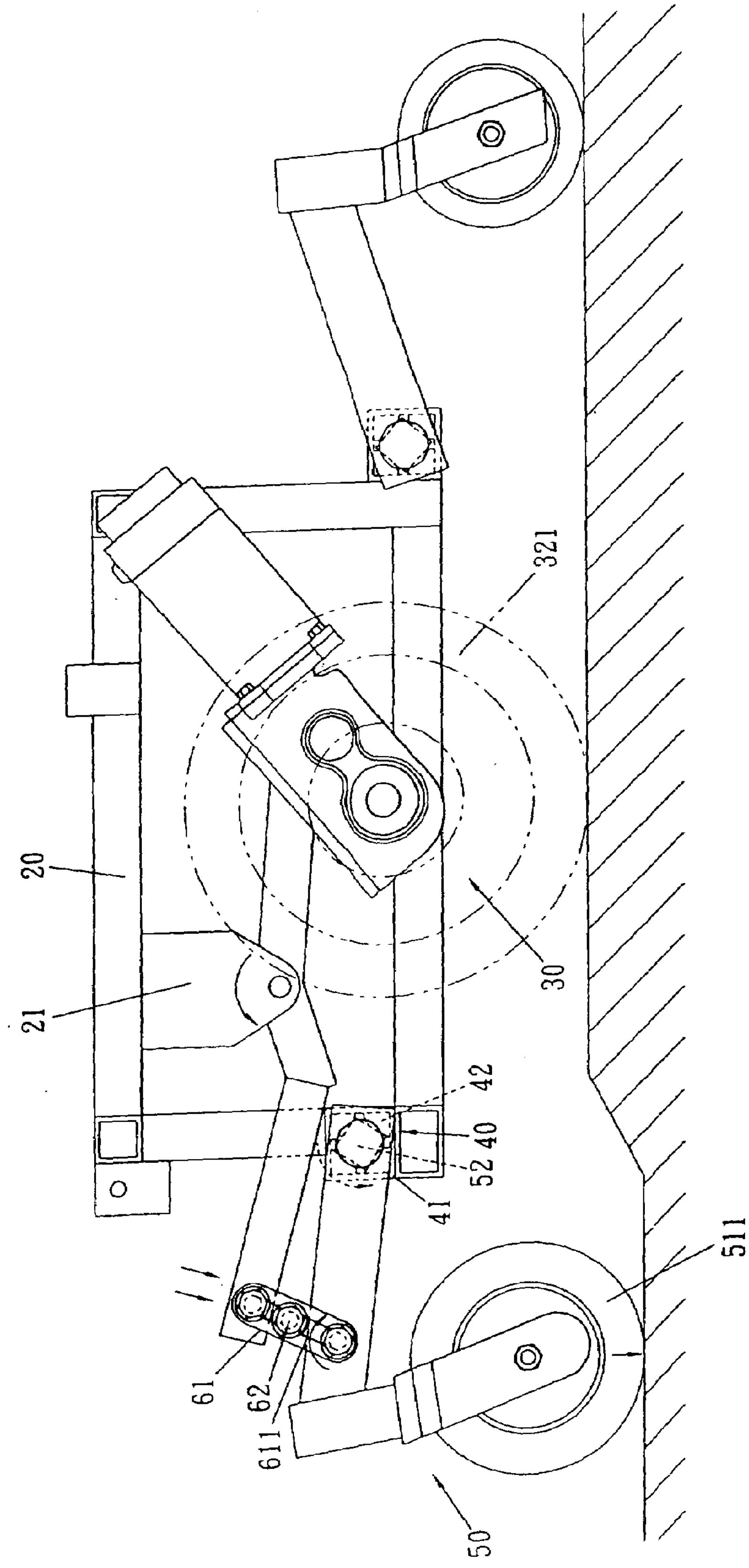

Referring now to FIG. 5, which shows a wheel chair of the present invention is riding down a slope. The castor 511 of the castor wheel bracket 50 locates at a relatively lower level of the slope. Accordingly, the squared rod 52 pushes the majority of the cushioning blocks 42 in the corresponding pedestal assemblies 40 (the cushioning blocks 42 are deformed and start to store energy) and causes a slight counterclockwise spin of the castor wheel bracket 50 (as indicated in FIG. 5). While the drive wheel bracket 30 is not pressed, so the pair of the plates 61 of the oscillating assembly 60 starts to the spin clockwise. Meanwhile, with the spin of the plates 61 together with roller 63 and the stripe aperture 611, the pressure is transmitted to the front end of the drive wheel bracket 30. And the rear portion of the drive wheel 321 of the drive wheel bracket 30 will take part of the pressure from the castor 511 (counterclockwise force) by virtue of the axel 34 of the drive wheel bracket 30 together with the aperture 211 of the ear member 21. Such that the descent of the castor bracket 511 will not cause an downward inclination of the front end of the frame 20, but cooperating with the drive wheel 321 of the drive wheel bracket 30 to descend the frame 20 steadily. Thereby, in case of ridding down a slope, the castor wheel bracket 50 and the drive wheel bracket 30 will slightly spin counterclockwise, and the frame 20 will slightly descend in steady without inclined as conventional frame do.

Until the castor bracket 50 and the drive wheel bracket 30 moving to both sides of the roller 63, which indicates that the descent of the castor bracket 50 is great (the downward slope is steep), the pressure of the castor 511 will be more precisely transmitted to the drive wheel bracket 30 by virtue of the roller 63 (the castor bracket 50 and the drive wheel bracket 30 acting as a whole). Thereby, the wheelchair of the present invention is able to adjust itself automatically in accordance with different downward slopes.

It will be noted that due to the anti-tipping brackets 70 are also provided with pedestal assemblies 40, the majority of the cushioning blocks 42 in the pedestal assemblies 40 will alike play a role in assisting the ascension and descent of the frame 20 so as to provide a smooth, safe and comfortable riding. In addition, the latitudinal expansion and compression of the pedestal assemblies 40 is actuated by the restoring force of the cushioning blocks 42, and the restoring force of the cushioning blocks 42 is only limited for recovering the deformation of it and will not be over great. Thereby, which will generate a smooth latitudinal expansion and compression of the pedestal assemblies 40.

It should be clear to those skilled in the art that further embodiments may be made without departing from the scope of the present invention.

What is claimed is:

1. A wheel bracket mechanism for an electric wheelchair equipped with auxiliary wheels comprising: a frame, a pair of drive wheel brackets, four pedestal assemblies, a pair of caster brackets, a pair of oscillating assembly and a pair of anti-tipping brackets; wherein:

the frame in shape of rectangle each having an aperture at both sides with symmetrical to each other and located between the front and rear end;

the drive wheel brackets provided with a motor and drive shaft secured at the rear end respectively, the drive wheel brackets secured to the frame via the aperture of it with a front end stretching ahead, an aperture formed at the front end of the each drive wheel brackets;

the pedestal assemblies disposed at both sides of the front and rear end of the frame;

the castor brackets each provided with a castor secured to a strut at the front end and a rod disposed at the rear end thereof, the rods received in the pedestal assemblies respectively, an aperture defined adjacent to the strut in the castor bracket with corresponding to the location of the aperture of the drive wheel bracket;

the oscillating assembly consisting of a pair of plates, a rolling shaft and a roller, the plates each provided with a stripe aperture, each of plates engaged with the aperture of the drive wheel bracket and the aperture of the castor bracket via the top and bottom of the stripe aperture respectively, the roller mounted onto the rolling shaft, then the rolling shaft movably disposed in the middle of the stripe aperture of the plates;

the anti-tipping bracket each provided with an anti-tipping wheel at the front end and a rod disposed at the rear end thereof, the rod received in the corresponding pedestal assemblies.

2. The wheel bracket mechanism for an electric wheelchair equipped with auxiliary wheels as claimed in claim 1, wherein the pedestal assemblies each consist of a tube and a plurality of cushion blocks, the tubes are disposed at both sides of the front and rear end of the frame respectively in pairs with locating opposite to each other, the cushion blocks are disposed in inner sides of the corresponding tube and defining a symmetric space, every rod of the castor brackets and the anti-tipping brackets has a threaded hole defined at the end and served to be received in the corresponding symmetric spaces of the pedestal assemblies, and with a covering member is fixed in the threaded hole.

3. The wheel bracket mechanism for an electric wheelchair equipped with auxiliary wheels as claimed in claim 2, wherein the cushioning blocks in the pedestal assembly define a symmetric space squared in cross section, every rod of the castor brackets and the anti-tipping brackets is symmetric formed with squared in cross section.

4. The wheel bracket mechanism for an electric wheelchair equipped with auxiliary wheels as claimed in claim 1, wherein the drive wheel bracket is a crank member.

* * * * *